US006957214B2

(12) United States Patent
Silberberg et al.

(10) Patent No.: US 6,957,214 B2
(45) Date of Patent: Oct. 18, 2005

(54) ARCHITECTURE FOR DISTRIBUTED DATABASE INFORMATION ACCESS

(75) Inventors: David P. Silberberg, Baltimore, MD (US); John R. Schneider, North Potomac, MD (US); Amy K. Karlson, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 495 days.

(21) Appl. No.: 09/887,364

(22) Filed: Jun. 22, 2001

(65) Prior Publication Data

US 2002/0023091 A1 Feb. 21, 2002

Related U.S. Application Data

(60) Provisional application No. 60/213,643, filed on Jun. 23, 2000.

(51) Int. Cl.[7] .............................................. G06F 17/30
(52) U.S. Cl. ............................................ 707/4; 707/10
(58) Field of Search ................................. 719/310–320; 707/1–10, 100–104.1, 200–206

(56) References Cited

U.S. PATENT DOCUMENTS

| | | | |
|---|---|---|---|
| 5,511,186 A | | 4/1996 | Carhart et al. |
| 5,537,589 A | * | 7/1996 | Dalal .......................... 707/101 |
| 5,596,744 A | | 1/1997 | Dao et al. |
| 5,634,053 A | | 5/1997 | Noble et al. |
| 5,713,020 A | * | 1/1998 | Reiter et al. ................. 707/102 |
| 5,794,246 A | * | 8/1998 | Sankaran et al. ........... 707/101 |
| 5,895,465 A | | 4/1999 | Guha |
| 6,148,298 A | * | 11/2000 | LaStrange et al. .............. 707/5 |
| 6,163,774 A | * | 12/2000 | Lore et al. ...................... 707/2 |
| 6,226,649 B1 | | 5/2001 | Bodamer et al. |
| 6,233,586 B1 | | 5/2001 | Chang et al. |
| 6,236,997 B1 | | 5/2001 | Bodamer et al. |
| 6,260,037 B1 | * | 7/2001 | Bestgen et al. ................. 707/4 |
| 6,263,342 B1 | | 7/2001 | Chang et al. |
| 6,272,488 B1 | | 8/2001 | Chang et al. |
| 6,282,537 B1 | | 8/2001 | Madnick et al. |
| 6,285,997 B1 | | 9/2001 | Carey et al. |
| 6,341,277 B1 | | 1/2002 | Coden et al. |
| 6,405,207 B1 | * | 6/2002 | Petculescu et al. ......... 707/102 |
| 6,526,403 B1 | | 2/2003 | Lin et al. |
| 6,546,381 B1 | | 4/2003 | Subramanian et al. |
| 6,578,046 B2 | | 6/2003 | Chang et al. |
| 2001/0049685 A1 | | 12/2001 | Carey et al. |
| 2002/0019822 A1 | | 2/2002 | Seki et al. |
| 2002/0032675 A1 | | 3/2002 | Williamowski et al. |

OTHER PUBLICATIONS

SEMQL: A Semantic Query Language for Multidatabase Systems, Proceedings of the 8th. International Conference On Information Knowledge Management. CIKM '99. Nov. 2–6, 1999. pp. 259–266, XP000895329, Jeong–Oog Lee and Doo–Kwon Baik.

* cited by examiner

Primary Examiner—St. John Courtenay, III
(74) Attorney, Agent, or Firm—Benjamin Y. Roca

(57) ABSTRACT

A system for accessing information from data sources. A user domain translates queries from users and applications for recognition by an aggregation domain, receives responses from the aggregation domain, and translates the responses for recognition by the users and applications. An aggregation domain receives translated queries from the user domain, translates the queries for recognition by a data source domain, receives responses from the data source domain, translates the responses for recognition by the user domain, and transmits the translated responses to the user domain. A data source domain receives the translated queries from the aggregation domain, identifies data sources to receive the queries, translates the queries to the data sources, receives responses from the data sources, translates the responses, and transmits the translated responses to the aggregation domain. A knowledge base the domains use to automatically function includes data models and conceptual terminology translations.

16 Claims, 12 Drawing Sheets

$\Phi\ (\Pi_{sname}(XML)) => \Pi_{student\_name}(Generic)$
$\Phi\ (\Pi_{dept}(XML)) => \Pi_{dept\_name}(Generic)$
$\Phi\ (\Pi_{pname}(XML)) => \Pi_{advisor.prof\_name}(Generic)$ Φ ($\Pi_{sname}$(Grades)) => $\Pi_{student\_name}$(Generic)

Φ ($\Pi_{dept}$(Grades)) => $\Pi_{dept\_name}$($\sigma_{major.dept\_name='CS'}$(Generic))

Context for student role (from context 1)

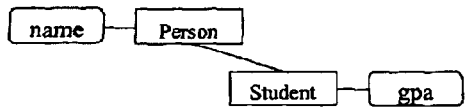

```
SELECT   P1.name
FROM     person AS P1
         NATURAL JOIN student AS S1
           ON P1.name = S1.student_name_fk
WHERE    S1.gpa >= 3.5
```

Context for professor role (from context 3)

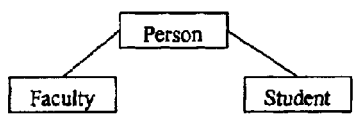

```
FROM     faculty AS F1
         NATURAL JOIN person AS P2
           ON P2.name = F1.faculty_name_fk
         NATURAL JOIN student AS S2
           ON P2.name = S2.student_name_fk
```

Context for professor's professor role (from context 2)

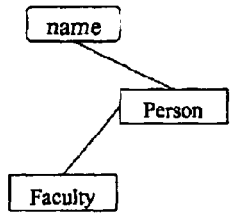

```
SELECT   P3.name
FROM     faculty AS F2
         NATURAL JOIN person as P3
           ON P3.name = F2.faculty_name_fk
```

Bridge between student and professor roles

```
FROM     student AS S1                            // from student role
         RIGHT OUTER JOIN faculty AS F1           // from professor role
           ON S1.student_professor_name_fk =      // bridge
                F1.faculty_name_fk
```

Bridge between professor and professor's professor roles

```
FROM     student AS S2                            // from professor role
         RIGHT OUTER JOIN faculty AS F2           // from professor's professor role
           ON S2.student_professor_name_fk =      // bridge
                F2.faculty_name_fk
```

Figure 12. Contexts and Query Fragments

Fig. 12

ARCHITECTURE FOR DISTRIBUTED DATABASE INFORMATION ACCESS

CROSS-REFERENCE TO RELATED APPLICATIONS

This application is a U.S. provisional application No. 60/213,643, filed Jun. 23, 2000, the entire contents of the disclosure of which is hereby incorporated by reference.

BACKGROUND OF THE INVENTION

1. Field of the Invention

The present invention relates to a system and method for enabling users of a plurality of domain perspectives to access information stored in a plurality of distributed and heterogeneous structured data sources.

2. Description of the Related Art

Information consumers, such as users, agents, and application programs, often require information that cannot be found in any single data source or at any single location, but rather in a variety of databases and formats including relational databases, XML documents, frame-based knowledge bases, object-oriented databases, and flat files. Unfortunately, it is difficult for systems to locate, extract, aggregate, correlate, and apply the data necessary to provide the right view of the information to the right people in a timely and efficient manner. Too many applications are overwhelmed by the sheer volume and heterogeneity of the data and are hindered by their inability to provide a coherent and useful interpretation of the information contained within it. In addition, there is much information hidden within the data that can be discovered by data mining, knowledge discovery, and data fusion techniques.

Thus, many systems share a common need for dynamic access to distributed and heterogeneous data sources. Without having a simplified query brokering capability, each application programmer typically must locate the data sources that provide an appropriate type of information, understand the associated data source schemas and ontologies, formulate queries to those sources in their native query languages, assemble the results in accordance with data source interrelationships, and convert the results into a format desired by users and calling applications. This can be a formidable task that requires significant programming skills as well as much knowledge of the data sources stored at multiple sites. Since applications are unique, this process must be repeated for each software system. Furthermore, as data sources evolve or others are added, it is extremely difficult for programmers to maintain current knowledge of the data environment and to maintain existing application programs.

SUMMARY OF THE INVENTION

Thus, intelligent information management tools like ADINA, as described in SILBERBERG, D., SCHNEIDER, J., KARLSON, A. and COLLINS, G. (1999): Supporting Universal Data Query and Data Fusion for Network-Centric Warfare. *Proceedings of the DoD '99 Database Colloquium*, AFCEA Press; KARLSON, A., SEMMEL, R. D. and SILBERBERG, D. P. (2000): A Knowledge-Based Architecture for Distributed Information Access. *Handbook of Software Engineering & Knowledge Engineering, World*, ed. Dr. S. K. Chang, Scientific Publishing (in press); and SCHNEIDER, J. and SILBERBERG, D. (1997): Achieving Information Interoperability for Satellite Communication Control Systems, *Proceedings of the DoD '97 Database Colloquium*, AFCEA Press, pp. 1–13, the entire contents of the disclosures of all of which are hereby incorporated by reference, are required to simplify the tasks of application programmers with respect to both creating new applications and maintaining current applications that access distributed and heterogeneous information sources.

ADINA provides access to integrated data through ad-hoc and high-level queries of the underlying data environment. Applications express requests for information as if they were querying a single database table that was created using attribute names of the applications' domains. Since the queries are dynamic, they permit applications to view information from new and unanticipated perspectives. This allows users and applications to concentrate on asking "what if" questions rather than forcing them to understand the underlying data source structures.

ADINA insulates requesters from the complexities of the data source schemas, ontologies, and query languages as well as their inter-relationships by using heuristics that reason over knowledge-based models of the user and data environments to determine the likely intent of user requests. Information in the models are used to select appropriate data sources, navigate their underlying ontologies, formulate and dispatch query requests, and aggregate the results. ADINA then returns unified data results to the consumer as well as the data pedigree and an explanation of the query process, which can aid in diagnosing and fixing problems. Since information can be requested in unanticipated ways and in a schema-independent manner, ADINA enables information consumers to discover new correlations among existing data.

Data sources maintain their autonomy when integration is carried with the ADINA system because they provide only descriptions of their own schemas and ontologies. Traditional integration of data sources into distributed systems typically requires that they either adhere to standard schemas or that they provide specialized software wrappers to access data. Neither is an optimal solution. Standards are often difficult to achieve and enforce. Along these lines, multiple and conflicting standards emerge, which can hinder the ability for their respective data sources to integrate. In addition, data source providers often do not have the resources to redesign legacy databases according to the standards. Furthermore, standard schemas can inhibit the ability for data sources to express their unique information.

Software wrappers typically are not an optimal solution because they are static and provide predetermined access to data sources. While software wrappers are often written to provide the most important views of the data, they usually do not provide a mechanism to access the data from unanticipated perspectives. In order to achieve this, software wrappers need to be upgraded, which is a timely, costly, and error-prone process. Furthermore, software wrappers also need to be upgraded to reflect the modifications to data source schemas.

In contrast, ADINA integrates data sources through table-driven, semantic descriptions of ontologies, schemas, and terminology supplied by both new and legacy data source providers. In addition, data sources are not required to have awareness of other sources. Thus, the effort to integrate new sources is independent of the number of data sources to be integrated.

ADINA provides software applications with resilience to data source modifications and evolution because it integrates domains and data sources at the semantic level rather than the structural level. Many systems require both user domain and database models to map their structures to a common model. In general, such mappings are difficult and require models to change to achieve compatibility.

Furthermore, if any of the models are altered or evolve, then the overall system cannot function until the structures are remapped. In contrast, ADINA's models are mapped at the semantic, not structural, level. Only terms, the roles that terms assume with respect to each other, and constraints in one domain are mapped to terms, roles, and constraints in another domain. Using heuristics that are described later, ADINA automatically infers the likely intended structure mappings from one domain to another. Thus, if model structures are modified or enhanced, ADINA automatically recalculates the structure mappings that are used to solve distributed queries.

The present invention provides a system for accessing information from a plurality of distributed and heterogeneous data sources each having a plurality of users and applications with a plurality of domain perspectives. The architecture includes a user domain, an aggregation, or generic, domain, a data source domain and a knowledge base.

The user domain module is operable as an interface with the applications and the users, usually through applications. The user domain is operable to translate queries from the users and the applications into a form recognizable by an aggregation domain module, receiving responses from the aggregation domain module, and translating the responses into a form recognizable by the users and applications. The aggregation domain module is operable to receive translated queries from the user domain module, identify target data sources that can provide the results of the query, translate the queries into subqueries in forms recognizable to a data source domain module; and receive responses from the data source domain module, aggregate the responses into a single response, translate the single response into a form recognizable by the user domain module, and transmit the translated response to the user domain module. The data source domain module is operable to receive the translated queries from the aggregation domain module, translate the queries to the query languages supported by specific to the identified data sources, receive responses from the identified data sources, translate the responses into a form recognizable by the aggregation domain module, and transmit the translated responses to the aggregation domain module. The knowledge base includes a data model of the generic domain, data models of each data source, conceptual terminology translations between the user domains and the generic domain and conceptual terminology translations between the generic domain and the data sources. The knowledge base is used by the user domain module, aggregation domain module, and the data source domain module to perform their functions. The synthesis of the knowledge base contents enables the three domain modules to translate high-level queries to and return aggregated responses from a plurality of distributed heterogeneous data sources.

The present invention also includes a method for maintaining application and data source autonomy. The method includes providing an intermediate layer that decouples users and applications from underlying data sources.

Additionally, the present invention includes a method for accessing information from distributed heterogeneous sources. The method includes receiving queries from users and applications. The queries are translated into a form from which it can be determined the data sources to address the queries. Data sources that the queries should be transmitted to are determined. The queries are transmitted to the data sources. Responses to the queries are received. The responses are aggregated from individual data sources into a single response. The responses are translated into a form recognizable to the users and applications. The responses are transmitted to the users and applications.

Furthermore, the present invention includes a system for accessing information from a plurality of diverse data sources. The system includes a user domain module that includes a query parser for receiving queries from users and applications. The queries include information to be retrieved, the roles that they assume with respect to each other, and constraints associated with the information. An attribute name resolver translates the queries into a form recognizable to an aggregation, or generic, domain. An aggregation to user domain converter translates responses to the queries into a form recognizable by the applications and users. The system also includes an aggregation domain module that receives translated queries from the user domain and determines locations of data for responding to the queries. A location resolver determines a best location for data when multiple locations exist. A data aggregation function receives responses from data sources and translates data in the responses into a form recognizable by the user domain. The system also includes a data source domain module. The data source domain module includes a generic to data source converter for converting query attributes to a form recognizable to locations where the data is stored, a query generator to automatically formulate queries to the data sources in native query languages of the data sources, a query transmitter for transmitting the formulated queries to the data source locations, and a data converter for receiving responses to the formulated queries from the data storage locations and translating the responses to the terminology of the generic to attribute name converter. The system also includes a knowledge base module. The knowledge base includes a data model of the generic domain, data models of each data source, conceptual terminology translations between the user domains and the generic domain and conceptual terminology translations between the generic domain and the data sources. The knowledge base is used by the user domain module, aggregation domain module, and the data source domain module to perform their functions. The synthesis of the knowledge base contents enables the operation of the functions described above.

Still further, the present invention includes a system and a computer program product that include a memory operable to store and a computer readable medium, respectively, that store computer program instructions for carrying out methods according to the present invention.

Still other objects and advantages of the present invention will become readily apparent by those skilled in the art from a review of the following detailed description. The detailed description below shows and describes preferred embodiments of the present invention, simply by way of illustration of the best mode contemplated of carrying out the present invention. As will be realized, the invention is capable of other and different embodiments and its several details are capable of modifications in various obvious respects, without departing from the invention. Accordingly, the drawings and description are illustrative in nature and not restrictive.

BRIEF DESCRIPTION OF THE DRAWINGS

Objects and advantages of the present invention will be more clearly understood when considered in conjunction with the accompanying drawings, in which:

FIG. 12 represents a diagram that illustrates how query fragments are derived from the contexts and how they are combined to form the full relational query;

DETAILED DESCRIPTION

The present invention relates to a system and method for enabling users of a plurality of domain perspectives to access information stored in a plurality of distributed and heterogeneous structured data sources. The present invention enables users and applications to express requests for information that is located in the plurality of data sources by expressing requests for just the data elements desired, the roles that the data elements assume with respect to each other, and the constraints on data elements. The users and applications do not need to know where the data sources are located, the structure of the data sources, the query languages of the data sources, or the inter-relationships among the data sources. Furthermore, the present invention enables users and applications to request information using their own domain vocabularies.

The present invention also provides a method for maintaining application and data source autonomy by providing an intermediate layer that decouples applications from underlying information sources. Users, applications, and data sources provide descriptions of their vocabularies and structures. There is no requirement for software wrappers to be placed around data sources and there is no requirement that data sources adhere to standard design structures and vocabularies. In addition, there is no requirement that users and applications use a common query vocabulary.

Additionally, the present invention provides a method for synthesizing a generic domain model of the overall data domain of interest, user domain models, and data source models in a mediating multi-level knowledge base. This is used by each of the modules below to solve query requests and return an aggregated data result.

Figure 1:
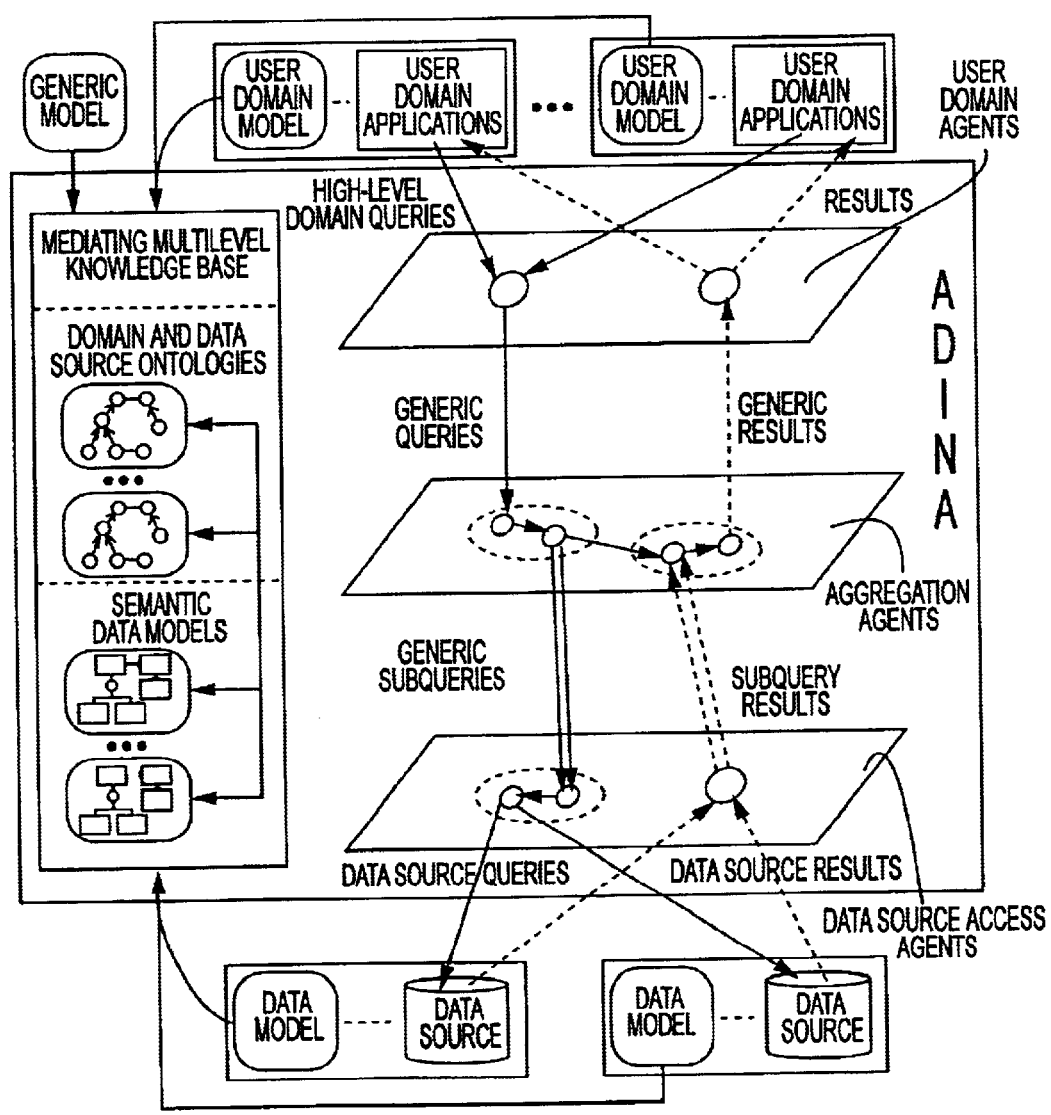
FIG. 1 represents a diagram that illustrates an example of the architecture according to the present invention.

ADINA is a three-tiered, loosely-coupled federated data system that accepts high-level ad hoc requests, promotes complete data source and mission application autonomy, and enables mission applications to be resilient to data source additions and modifications. FIG. 1 depicts the ADINA architecture, in which each tier is supported by a multi-level knowledge base that contains models of domain users, data sources, and the overall generic environment.

User domain applications that are depicted at the top of FIG. 1 interact with ADINA to mediate queries to the underlying data sources. User domains represent different groups of users that interact with ADINA using unique sets of terminologies and perspectives. Examples of user domains include the Academic Advising and Course Scheduling domains of a university. Each domain is associated with a set of applications. For example, the Academic Advising domain might have applications that produce a list of students and their advisors and that search for poor performing students. Similarly, the Course Scheduling domain might have applications that print course schedules and list professor availability.

Data sources are also external to the ADINA architecture and are depicted at the bottom of FIG. 1. The data sources must be stored in a structured data management system that enables structured query access. Example data sources that can be integrated into ADINA are XML repositories that support XML queries, such as a Student-Faculty document set, or relational database systems that support SQL queries, such as a Grade database.

Internal to ADINA, the top, or user domain agents, tier contains software agents that interact with applications to interpret user domain-specific requests within the context of the overall generic domain. In addition, they translate data results to the terminology of requesting applications. The middle, or aggregation agents, tier contains agents that locate the data sources that can contribute to the results and that dispatch requests to those sources. In addition, it contains agents that aggregate results from the distributed sources. The bottom, or data access agents, tier contains agents that formulate the dispatched requests in the terminology and query language of the data source domains and that format the returned results to the generic domain format.

Figure 2:
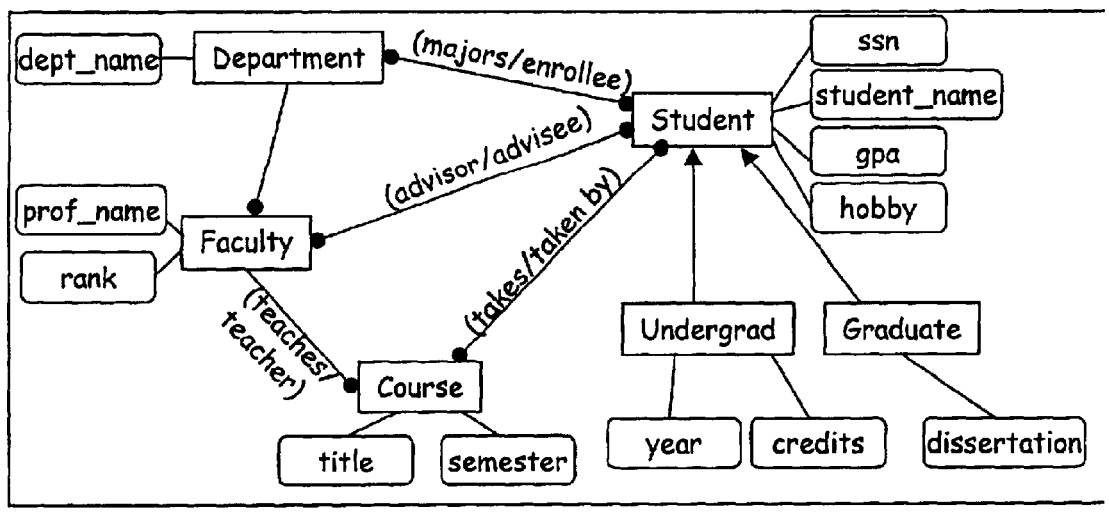
FIG. 2 represents a diagram that illustrates an example ontology for an academic domain.

To prepare ADINA for intelligent query processing, domain engineers provide a generic model, or ontology, of the overall domain of discourse of the applications and data sources to the ADINA knowledge base. The generic model is independent of individual applications and data sources, but captures the semantics of the overall domain through classes, subclasses, properties, and relationships. The generic model provides the structured common representation of the environment that acts as the glue between the user domain models and the data models. FIG. 2 shows an example generic ontology model for an academic domain. The ontology uses shaded boxes to define classes and subclasses as well as arrows to define class hierarchies. The example ontology represents Department, Faculty, Student, and Course classes as well as the Undergrad and Graduate subclasses of the Student class. Properties are represented by ovals and they are associated with classes by straight lines. For example, the ssn, student_name, gpa, and hobby properties are associated with the Student class while the title and semester properties are associated with the Course class. Relationships are represented by lines between classes and are labeled by the roles that they assume with respect to each other. In addition, relationship cardinalities are represented by circles at the ends of lines. A circle at the end of a line represents a many side of a relationship while no circle represents a one side of a relationship. In the figure, there is a many-to-many relationship between the Student and Course classes, and the classes assume the takes and taken by roles with respect to each other. Similarly, there is a one-to-many relationship between the Faculty and Course classes, and the classes assume the teaches and teacher roles with respect to each other.

User domain engineers provide user domain models to the ADINA knowledge base that describe high-level concept mappings to the generic model. The concept mappings translate between familiar terminology, expressed by property names, the roles that they assume with respect to each other, and constraints, of the user domain to property names, roles, and constraints of the generic model. However, the mappings do not map ontology structures between models. This feature enables systems to be resilient to structural changes of the generic and underlying data source models.

Figure 3:
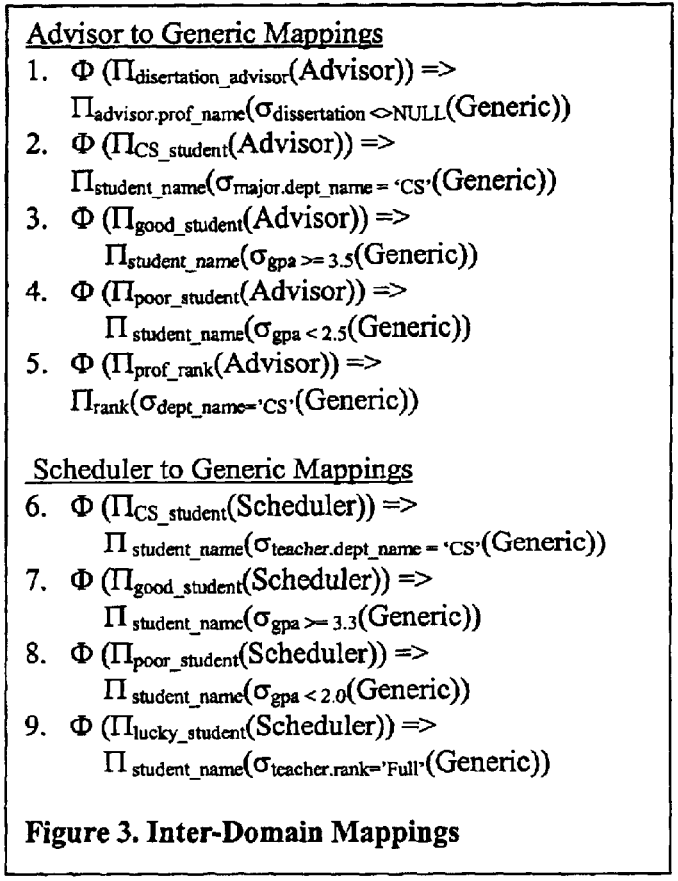
FIG. 3 represents a diagram that illustrates examples of concept mappings from example user domains to the example academic domain.

FIG. 3 depicts example Advisor to Generic academic domain mappings as well as Scheduler to Generic academic domain mappings. The mappings are expressed by a mapping function, $\Phi$, which uses relational calculus notation, but without any ontology navigation (join) criteria. For example, the first Advisor to Generic mapping specifies that the term dissertation_advisor in the Advisor domain is the prof_name of one who assumes the role of advisor for those who are writing dissertations in the Generic domain. The fourth mapping defines a poor_student in the Advisor domain as a student_name of a student with a gpa less than 2.5 in the Generic domain. The eighth mapping defines a poor_student in the Scheduler domain as a student_name of a student with a gpa less than 2.0 in the Generic domain. Notice that the same term in different domains, such as poor_student, can have different meanings.

Similarly, data sources register with the ADINA knowledge base by providing the structured data models of their respective data sources as well as high-level, structure-independent concept mappings from the terminology of the data models to the terminology of the generic model. This, too, enables systems to be resilient to data source model changes.

Figure 4:
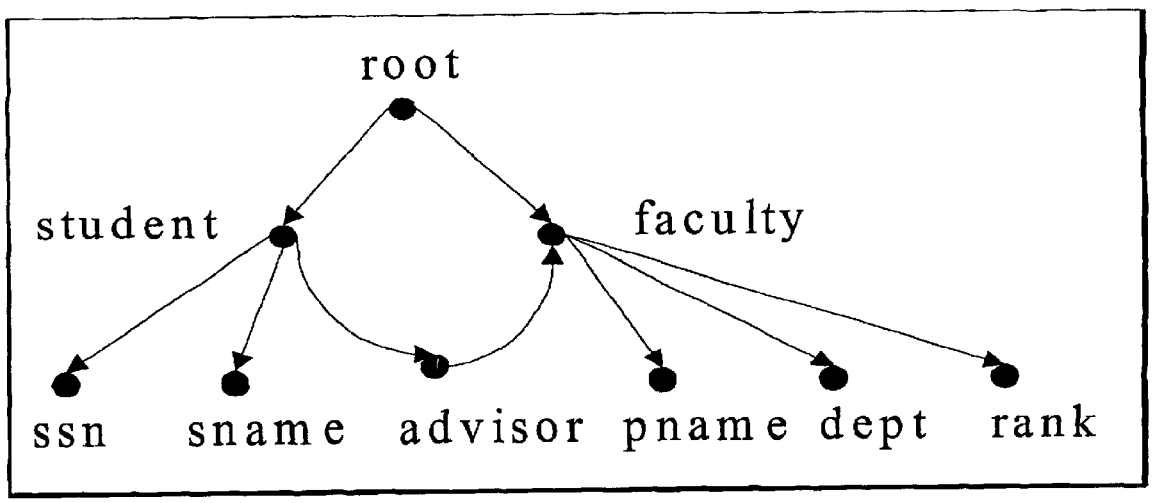
FIG. 4 represents a diagram that illustrates an example of a student-faculty XML document set structure and example concept mappings from it to the academic domain.
Figure 5:
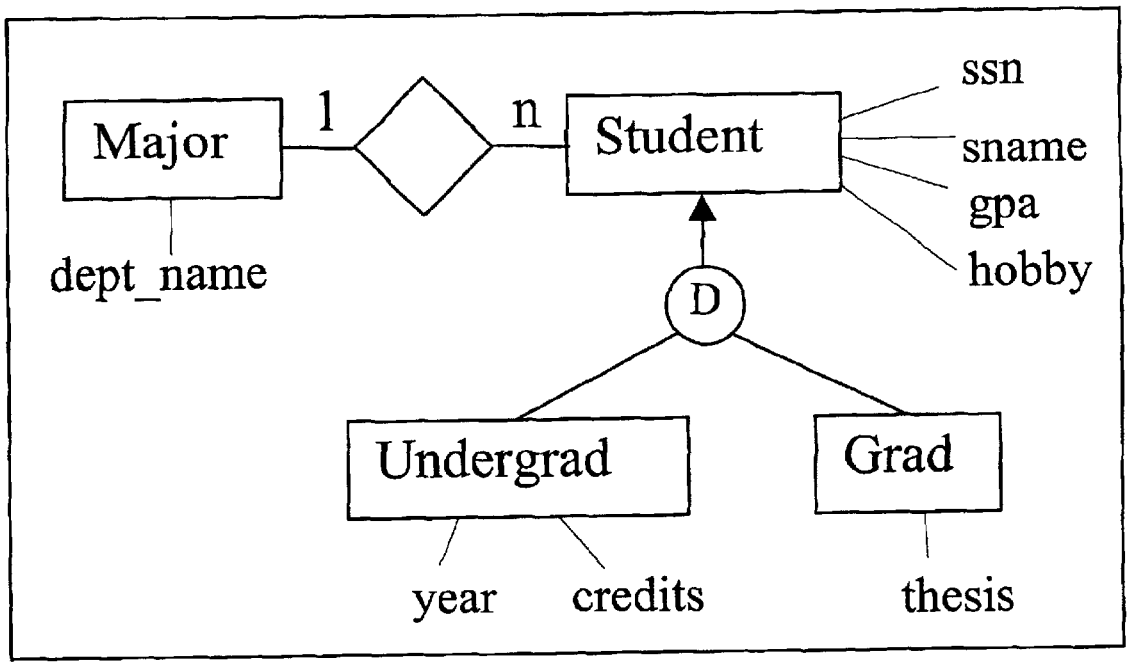
FIG. 5 represents a diagram that illustrates an example of a relational database schema that stores grades and example concept mappings from it to the academic domain.

For example, FIG. 4 represents a semi-structured ontology of an XML Student-Faculty document set, which will be described later. It also defines the inter-domain concept mappings between the XML document set and the generic ontology. Similarly, FIG. 5 represents an extended-Entity Relationship (EER) schema of a Grade database as well as its inter-domain concept mappings to the generic ontology. The EER model also will be described in detail later. In both cases, the high-level concept mappings are independent of structure and thus, resilient to model changes in either environment. During query execution, the ADINA knowledge base is responsible for synthesizing the user domain, generic, and data source concept mappings as well as the data models to provide applications with "personal" views of the underlying data.

Query Execution

Figure 6:
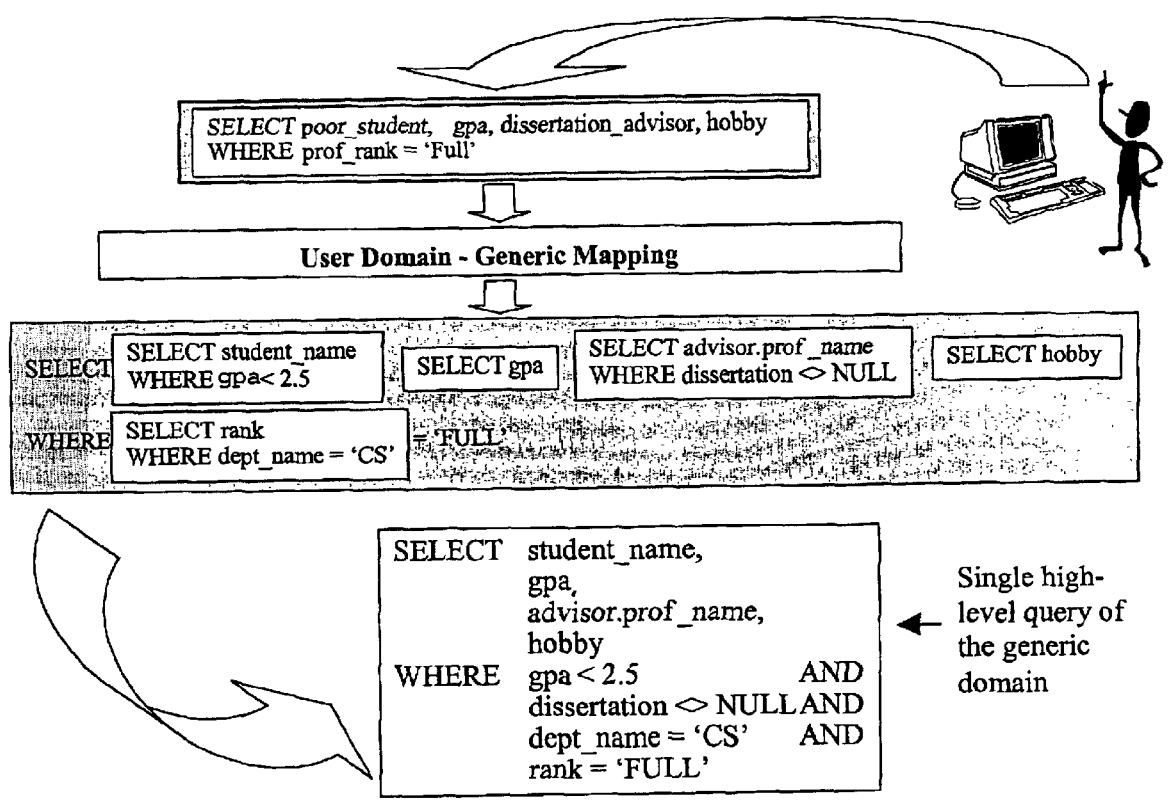
FIG. 6 represents a diagram that illustrates an example first stage of the query execution process.

FIG. 6 depicts a user interacting with an application, which needs information from underlying data sources. A high-level query is formulated in the terminology of the user domain that requests a list of properties, poor_student, gpa, dissertation_advisor, and hobby, and constraints, rank="Full". Presumably, the user has a theory that poor students either have poor dissertation advisors or are involved in time-consuming hobbies. High-level queries express no information about how to navigate ontologies to solve the queries, no indication about which data sources can provide the results, and no guidance about how to aggregate the results from the underlying data sources. The high-level query is presented to ADINA, where the User Domain agents translates user domain terms to generic ontology terms based on the user domain mappings stored in the knowledge base. The primary translation mechanism replaces high-level terms with embedded high-level query statements. For example, poor_student maps to SELECT student_name WHERE gpa<2.5. Then, the query expression with the embedded translations is manipulated into a single high-level query of the generic domain. This query, too, provides no information about how to navigate ontologies, no indication about which data sources can provide the results, and no guidance about how to aggregate the results from the underlying data sources.

Specifically, the conceptual translation process translates the high-level query terms to terms of the generic domain. Translations are attempted for all terms of the SELECT clause and the WHERE clause. In all cases, if no translation exists for a term in the domain from which the query was submitted, the high-level term is passed "as is" to the generic domain. For each term of the SELECT clause, the set of conceptual terminology mappings from the user domain to the generic domain is searched to find the set of conceptual terminology mappings associated with the term. If the mapping specifies that the user-domain term requires WHERE clause constraints, the high-level query is searched to find the matching WHERE clause constraints. If they exists, the term is translated to a SELECT and WHERE clause term of the generic domain. If more than one match exists in the conceptual mapping list, the mapping that covers the most WHERE clause terms of the user-domain query is selected and translated to the SELECT and WHERE clause term of the generic domain. If two or more translations are equally likely, the first translation is selected. A summary of all conceptual translations that are selected are captured and provided to the user for informational purposes. This process is repeated for all terms of the user-domain query SELECT clause.

The translation of terms in the user-domain query WHERE clause is similar. However, if a term of the user-domain query WHERE clause participated in the translation of a term in the user-domain query SELECT clause, it is not translated, since its effects have already been translated into one of the terms of the generic-domain query SELECT clause.

After all the terms have been translated to generic-domain terms, all the terms of the generic-domain query, each of which may contain both SELECT and WHERE terms, are translated to a simple high-level generic domain query as depicted in FIG. 6. The SELECT terms of the SELECT clause, such as student_name, gpa, advisor.prof_name, and hobby, are placed into the simple SELECT clause. The WHERE terms of the SELECT clause, such as gpa<2.5 and dissertation<>null, are placed into the simple WHERE clause. The SELECT terms of the WHERE clause, such as rank, are placed into the simple WHERE clause and modified to capture the constraints of the user-domain query. Thus, rank='FULL' is placed into the simple WHERE clause. Finally, the WHERE terms of the WHERE clause, such as dept_name='CS', are placed into the simple WHERE clause.

While the process described above is the current translation process, in the future, this process might be enhanced to incorporate other types of conceptual translation mappings.

Figure 7:
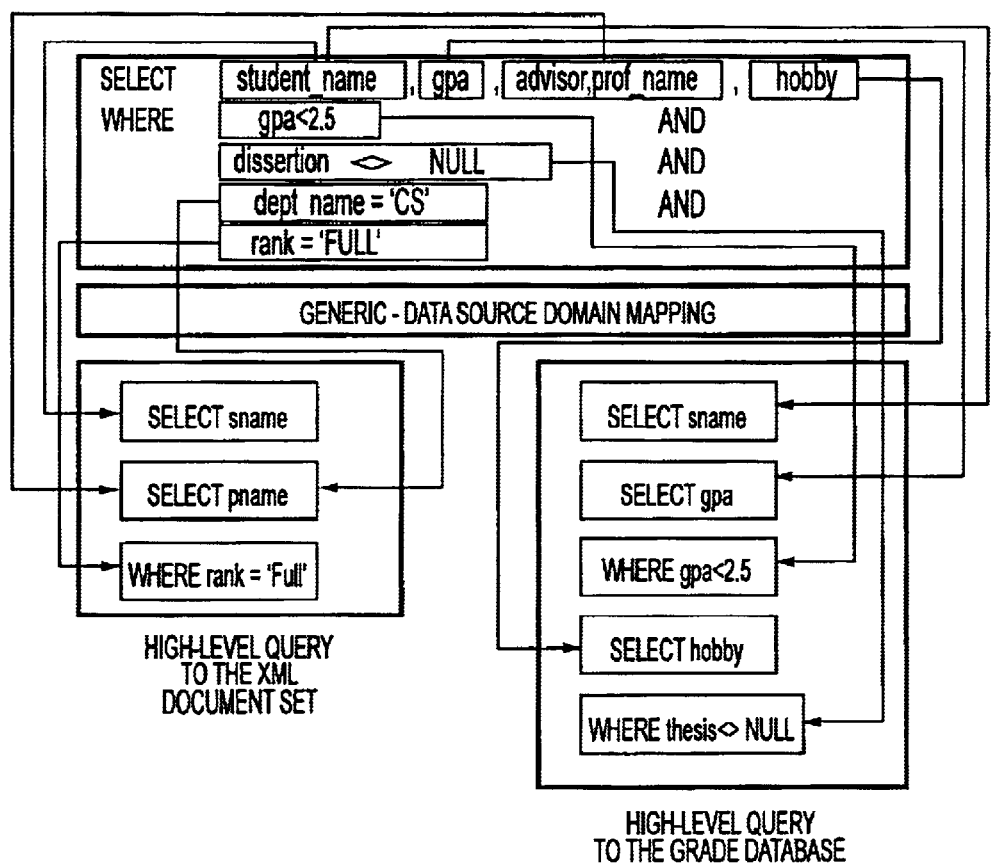
FIG. 7 represents a diagram that illustrates an example second stage of the query execution process in which the appropriate data sources are identified for querying.

Based on the generic query, agents at the Aggregation Agents level of the ADINA architecture use knowledge of the registered data sources to identify the data sources that can provide information to solve the query. As depicted in FIG. 7, ADINA identifies a Grade database to provide grade and hobby information, and an XML Advisor document set to provide advisor information. ADINA groups the properties according to the data sources that provide information. In addition, agents at the Data Source Access Agents layer of the ADINA architecture translate the generic property names to the properties names used by the respective data sources. These intermediate groups of properties, in turn, are translated to high-level queries of each data source using the same conceptual translation process that was described above. The associated high-level queries are depicted in the top level boxes of FIG. 8.

Until this point, all queries and their transformations have been expressed in the high-level query language to avoid dependence on ontology structures, which enables ADINA to operate properly even when data source structures are modified. Since high-level queries cannot be evaluated by the data sources, ADINA uses the Extended QUICK (EQUICK) agent to translate high-level queries into native-language queries of the underlying data source management systems that navigate their respective ontologies. The EQUICK agent is discussed below in greater detail. However, any agent that functions in a manner similar to EQUICK can be used. Queries are dispatched to each appropriate data source and the results are returned to ADINA.

Figure 9:
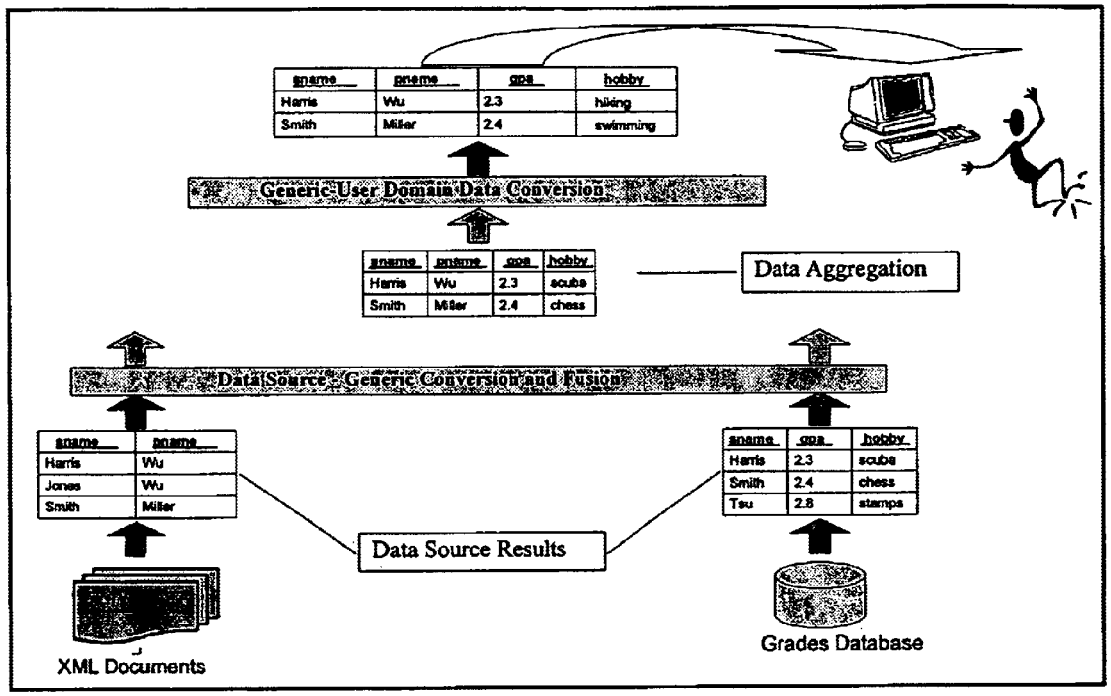
FIG. 9 represents a diagram that illustrates how data is returned to the calling application.

FIG. 9 depicts the process of returning data. Each source returns data to ADINA in its native format. At the Data Source Access Agents level, the data units are converted to common units that are expected at the generic Aggregation Agents level. There, the data results are aggregated, through joins and unions, into a single image in accordance with the relationships defined in the generic ontology. Thus, if the results from two data sources are related on a set of attributes described in the generic ontology, the Aggregation Agents software joins the results on these attributes. This process can be easily extrapolated to results from more than two data sources. The aggregated data is converted again by Domain User Agents to the units expected by the user's domain. Finally, the aggregated data expressed in the terminology of the user's domain is returned to the calling application and is tagged with the pedigree of the data as well as information about the conceptual translations selected and the data source queries formulated by EQUICK. Knowledge of the data pedigree enables users to "drill down" into the data to discover more detailed information about the results.

Since ADINA automatically integrates underlying information sources, additions and modifications to underlying information sources including their structures, schemas, and terminology are transparent to users and applications programs. Application queries are resilient to such changes because they are insulated from the evolving data environment. Thus, ADINA enables users to focus their efforts on analyzing information instead of correlating information from dynamic and evolving information sources.

EQUICK, as described in SILBERBERG, D. and SEMMEL. R. (1998): A Role-Based Semantics for Conceptual-Level Queries. *Proceedings of the Fifth International Workshop on Knowledge Representation Meets Databases* in conjunction with ACM SIGMOD/PODS '98. http://sunsite.informatik.rwth-aachen.de/Publications/CEUR-WS/Vol-10/ and SILBERBERG, D. and SEMMEL, R. (1998): Using Relationship Roles to Disambiguate Conceptual-Level Queries. *Proceedings of the Tenth International Conference on Software Engineering and Knowledge Engineering*, eds. Yi Deng and Mark Gerken, Knowledge Systems Institute, Skokie, Ill. pp. 327–334, the entire contents of the disclosures of both which are hereby incorporated by reference, is an automated query formulation agent that generates queries to heterogeneous data sources. It enables heterogeneous data sources to integrate into ADINA via self-describing files without requiring data sources to provide custom software wrappers or to adhere to standard schemas and ontologies. Data source ontologies are used as a means to heuristically construct meaningful queries within a reasonable amount of time. To facilitate distributed access and to simplify the development of intelligent interfaces, high-level requests to the query formulator need only specify data items to be retrieved, their roles, and associated constraints. Methods for reasoning over conceptual ontologies and schemas that describe the data sources are then used to infer corresponding queries. By maintaining a conceptual-level perspective of the underlying systems, users and applications are insulated from the ontology structures of underlying data sources and their corresponding query languages. EQUICK benefits both systems developers and designers seeking to access complex distributed and heterogeneous data in a semantically reasonable and efficient manner.

EQUICK is based on QUICK, as described in SEMMEL, R. D., IMMER, E. A., SILBERBERG, D. P. and WINKLER, R. P. (1997): Knowledge-Based Query Formulation for Integrated Information Systems. *Johns Hopkins APL Technical Digest*, 18:2, pp. 261–270 and SEMMEL, R. D. and SILBERBERG, D. P. (1993): Extended Entity-Relationship Model for Automatic Query Generation. *Journal of Telematics and Informatics*, Pergamon Press Ltd., Vol. 10, No. 3, pp. 301–317, the entire contents of the disclosures of both which are hereby incorporated by reference, which is an operational system that provides automated query formulation capabilities for relational databases. QUICK enables users and applications to express high-level and ad-hoc queries to relational database systems. The system reasons over extended Entity-Relation (EER) schemas of their respective databases to infer the likely intent of the user and formulate the corresponding SQL queries.

QUICK analyzes EER schemas to identify contexts, as described in SEMMEL, R. D. (1994): Discovering Context in an Entity-Relationship Conceptual Schema. *Journal of Computer and Software Engineering*, 2:1, pp. 47–63, the entire contents of the disclosure of which is hereby incorporated by reference. The set of contexts is the set of maximal acyclic paths through a data model for which functional dependencies exist among the entities or objects. Users and applications formulate high-level queries that specify only attributes and constraints. QUICK assumes that users generally intend that requested attributes be strongly related. Thus, QUICK identifies the contexts that contain the requested attributes and uses their corresponding navigation paths Ooin paths) to formulate corresponding SQL queries.

Contexts may be calculated in several steps. The first step may be to identify sub-contexts defined by the subclasses in the ontology. If a subclass is disjoint, then each of its related sub-contexts may be the set of all parents and one of the children. The second step may be to identify the acyclic extensions of the ontology graph and capture them as sub-contexts. These sub-contexts may subsume the sub-contexts that were created during the identification of sub-class sub-contexts. The sub-contexts at this point may be attached to the remaining cycles.

The third step may be to find strongly related acyclic paths within the cycles. This may be done by finding maximal paths of relationships with cardinalities many-to-one (m:1) and one-to-one (1:1) that describe strong functional relationships among the entities of the cycle. Thus, in a cycle, if A is related to B through an m:1 relationship, B is related to C through an m:1 relationship, and A is related to D through an m:1 relationship, then the sub-context will contain A, the relationship between A and B, B, the relationship between B and C, C, the relationship between A and D, and D. Thus, the sub-context captures A and everything that is functionally dependent upon A. However, in a cycle, if A is related to B through an m:1 relationship and B is related to C through an 1:m (not m:1) relationship, then there will be a sub-context that contains A, the relationship between A and B, and B as well as another sub-context that contains B, the relationship between B and C, and C. A will not be directly related to C since there is not a functional dependency between them. Note that if A, B, C, and their relationships would occur in an acyclic extension, the corresponding sub-contexts would contain A, the relationship between A and B, B, the relationship between B and C, and C independent of the direction of the cardinality of the relationships.

The fourth step may occur when all sub-contexts have been identified in the cycle(s). The sub-contexts identified in cycle(s) may be appended to the applicable acyclic extensions to create the complete set of contexts.

High-level queries specify attributes to retrieve and constraints. To create the corresponding data-source query, the tables in which the attributes reside and the join criteria typically must be derived and used to augment the high-level query. QUICK searches the set of contexts to identify those contexts that contain the entities of the high-level query attributes. It then prunes the contexts to just the context elements that need to be navigated for the join. If multiple pruned contexts are identical, only one of the identical contexts is kept.

The result of pruning yields one ore more unique sub-contexts that describe the path(s) through the ontology (data model) for the query. The join is derived for each context and the tables that are involved in the queries are identified. A data-source query is created for each context by augmenting the high-level query with the list of tables associated with the entities of the context and the join path. The final query is a union of the individual data-source queries for each context.

QUICK, however, is limited in several ways. It can only analyze EER schemas of relational databases and can only formulate SQL queries. QUICK cannot reason over other ontology formats to produce queries of other data source management systems. Furthermore, QUICK's high-level query language does not provide users and applications with semantic capabilities to express in domain-familiar terminology certain classes of complex queries including context discrimination and cyclic join-path queries. EQUICK addresses these issues by enabling both query formulation to other structured data sources such as XML document sets, object-oriented databases, and frame-based knowledge bases, and enabling users of ADINA to express complex high-level queries in familiar terms.

EQUICK is a single software agent that interprets ontologies that describe multiple, heterogeneous data sources and formulates source-level queries to them based on high-level query inputs. Like QUICK, EQUICK analyzes multiple ontologies to identify contexts of the underlying data sources. However, the query language is extended to enable users to express role-based queries, as described in SILBERBERG, D. and SEMMEL. R. (1998): A Role-Based Semantics for Conceptual-Level Queries. *Proceedings of the Fifth International Workshop on Knowledge Representation Meets Databases* in conjunction with ACM SIGMOD/PODS '98. http://sunsite.informatik.rwth-aachen.de/Publications/CEUR-WS/Vol-10/ and SILBERBERG, D. and SEMMEL, R. (1998): Using Relationship Roles to Disambiguate Conceptual-Level Queries. *Proceedings of the Tenth International Conference on Software Engineering and Knowledge Engineering*, eds. Yi Deng and Mark Gerken, Knowledge Systems Institute, Skokie, Ill. pp. 327–334, the entire contents of the disclosures of all of which are hereby incorporated by reference, which overcome the limitations of QUICK by allowing the expression of complex queries using only attributes, roles, and constraints. EQUICK infers complex navigation paths from ontologies to formulate corresponding SQL, OQL (object-oriented query language), XML, and frame-based queries to underlying sources.

In EQUICK, ontology relationships may define the roles that the entities assume with respect to each other. Contexts are calculated in the same way that they were calculated in QUICK.

High-level queries formulated to EQUICK can express both explicit tuple variables and implicit tuple variables. Implicit tuple variables may be expressed by embedded queries using clauses such as "select . . . from . . . where attribute in (select . . . )." In addition, high-level queries can express the attribute roles. Attributes can be prefixed by a combination of one or more explicit tuple variables and roles.

EQUICK may identify all roles and tuple variable combinations used in a query. Furthermore, it may identify all the non-prefixed attributes and assigns a "blank" tuple variable to them. A different blank tuple variable may be associated with each embedded query level. EQUICK groups the attributes that correspond to each unique tuple variable and role combination.

Then, for each group, the corresponding contexts are identified, joins may be generated for them, and multiple joins are combined by "or" clauses. Then, EQUICK relates the set of tuple variable and role combinations to each other. For example, a query that requests advisor.prof_name and student_name from a data source modeled by FIG. 2 must relate the context that contains prof_name in the role of advisor to another context in which student_name appears. Thus, EQUICK adds the join that expresses the advisor relationship to the query. Another example is a query that requests faculty.majors.prof_name, majors.dept_name, student_name, and year. EQUICK identifies three contexts for student_name and year, for dept_name that acts in the role of majors with respect to student_name and year, and for prof_name that acts in the role of faculty of majors with respect to majors dept_name. After EQUICK augments the query with the three contexts, it adds the joins that express both the majors relationship between dept_name and student_name as well as the faculty relationship between the prof_name and dept_name (which itself acts in the role of majors with respect to student_name).

The contexts derived for each tuple variable and role combination are placed with the embedded query level with which they are associated in the data-source query. The relationships that relate tuple variable role combinations are also placed with the embedded query level with which they are associated.

Joins between explicit tuple variables as well as implicit tuple variable via embedded query relationships may be explicitly stated by the query formulator in the high-level query. If the join criteria of tuple variables are all equality, the queries can be factored. This means that the final query can be the union of multiple queries, each of which has a unique combination of applicable contexts that express the query. However, if one of the join criteria is not equality, then the joins may not be factored.

Before the data-source queries are generated, the join information may be stored in a canonical format internally in EQUICK. When the final query is generated, the canonical query information is translated into the syntax of the target data-source query language. Then, the pieces of the query are assembled and the final query is generated.

Figure 10:
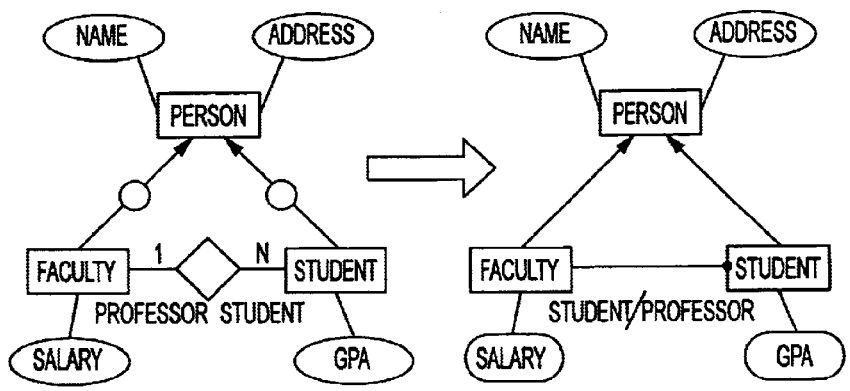
FIG. 10 represents a diagram that illustrates an example of how a database model represented by an extended Entity-Relationship diagram is translated to a model represented by the canonical modeling language.
Figure 11:
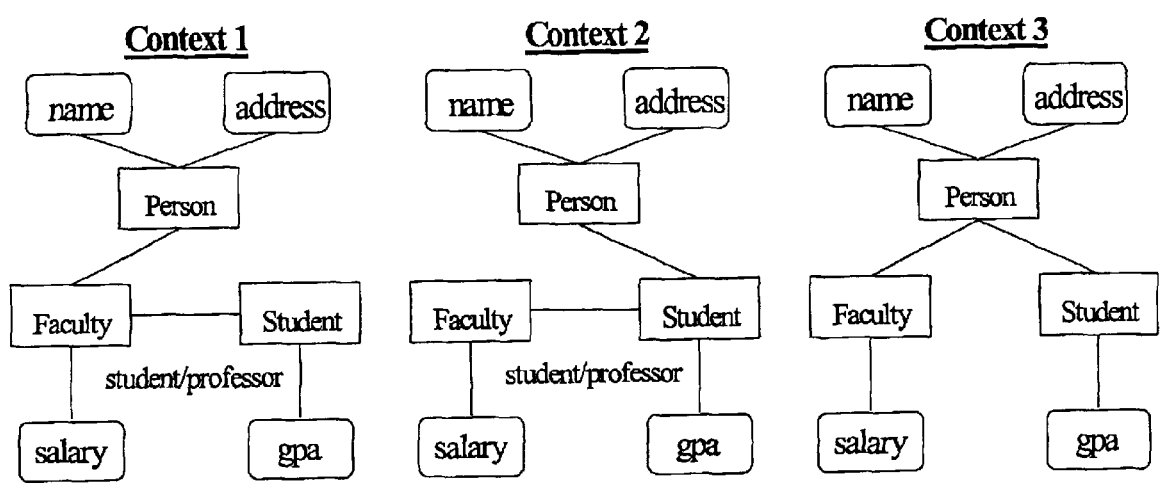
FIG. 11 represents a diagram that illustrates contexts that are derived from the model in FIG. 10.

For example, FIG. 10 depicts an EER diagram that models an academic relational database. The entities are Person, Faculty, and Student, which are represented by rectangles. Attributes are represented by ovals. Name and address are attributes of Person while salary and gpa are attributes of Faculty and Student, respectively. Faculty and Student are subclasses of Person and are denoted by an arrow with a circle. Faculty and Student are related to each other by a 1 to many (1:n) relationship, which is represented by a diamond. In this relationship faculty members act in the role of professor with respect to students and students act in the role of student with respect to faculty members. EQUICK translates the EER diagram to the generic model format and identifies corresponding contexts, which are depicted in FIG. 11.

Now, consider a user that would like a list of student names that have a GPA of 3.5 or greater and their associated professors' professors' names. Perhaps the user has a theory that good students can be correlated to their professors' professors. The corresponding role-base query would be formulated as such (role names precede other role and attribute names):

```
SELECT      student.name, professor.professor.name
WHERE       student.gpa >= 3.5
```

The query expresses the user's request without any knowledge of the structure of the database. EQUICK recognizes that the student, professor, and professor's professor contexts and their interrelationships must be navigated to solve the query. FIG. 12 depicts the three contexts, the associated query fragments, and the inter-context query fragments that are generated by EQUICK. Then, EQUICK assembles the query fragments, joins them via the inter-context query fragments, and produces the resulting SQL92 query:

```
SELECT      P1.name, P3.name
FROM        person AS P1 NATURAL JOIN student AS S1
              ON P1.name = S1.student_name_fk
            RIGHT OUTER JOIN faculty AS F1
              ON S1.student_professor_name_fk =
              F1.faculty_name_fk
            NATURAL JOIN person AS P2
              ON P2.name = F1.faculty_name_fk
            NATURAL JOIN student AS S2
```

-continued

```
              ON P2.name = S2.student_name_fk
            RIGHT OUTER JOIN faculty AS F2
              ON S2.student_professor_name_fk =
              F2.faculty_name_fk
            NATURAL JOIN person as P3
              ON P3.name = F2.faculty_name_fk
WHERE       S1.gpa >= 3.5
```

Figure 13:
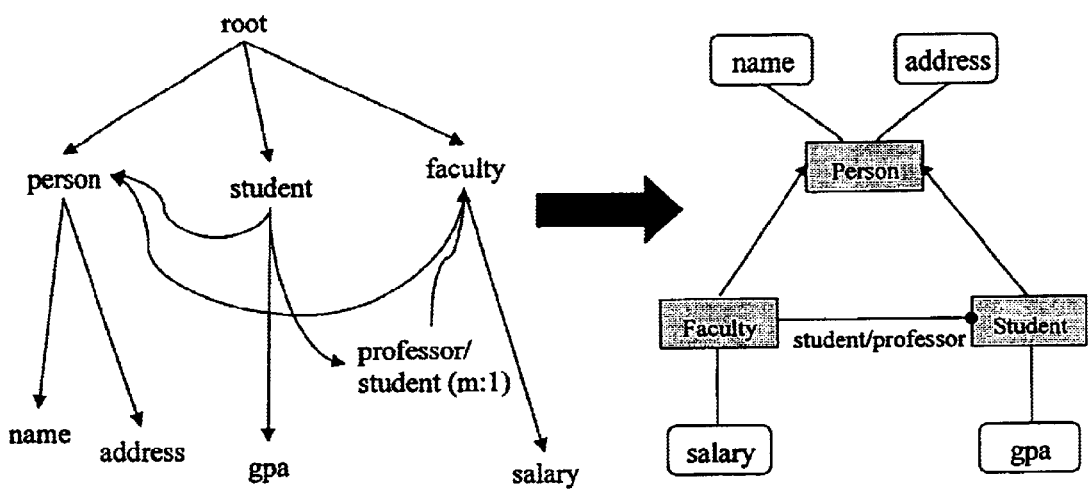
FIG. 13 represents a diagram that illustrates an example of how an XML model represented by a semi-structured diagram is translated to a model represented by the canonical modeling language.
Figure 14:
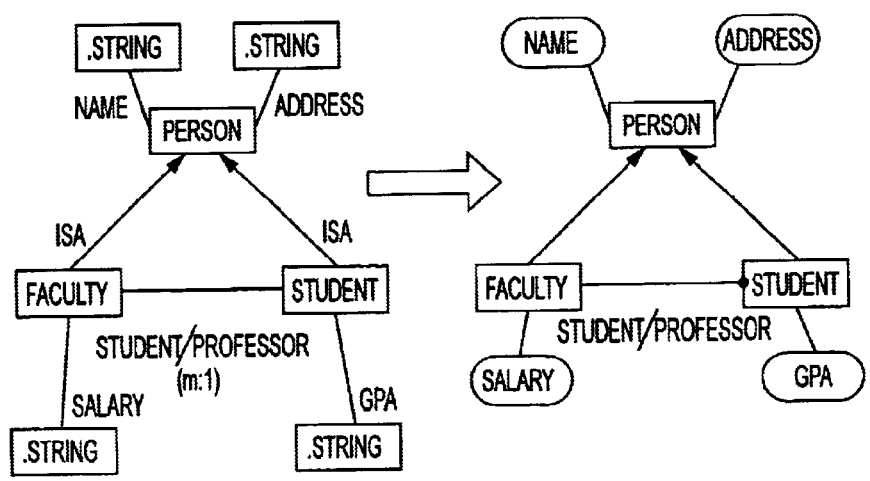
FIG. 14 represents a diagram that illustrates an example of how a frame-based model represented by a semantic network diagram is translated to a model represented by the canonical modeling language.

EQUICK duplicates this process for both XML document sets and frame-based knowledge bases. FIG. 13 depicts a semi-structured ontology of an XML document set that EQUICK translates to the generic model. Words represent the XML tags while arrows indicate defined hierarchies and references of the tags. Some tags, such as professor/student, represent relationships and relationship cardinalities among tags. FIG. 14 depicts a frame-based ontology. Rectangles represented frames (or classes) and lines represent frame slots. For example, name and address are slots of the Person frame. Arrows indicate inheritance. In the example, both Student and Faculty are subclasses of Person. In both figures, EQUICK translates the models to their respective generic models. In our examples, the models represent the same contexts and are therefore translated to the same generic model. Thus, their associated contexts are identical to those depicted in FIG. 12 and are used to process both XML and frame-based queries. For example, consider the same role-based query that requests a list of student names that have a GPA of 3.5 or greater and their associated professors' professors' names. EQUICK will identify the query fragments associated with each of the student, professor, and professor's professor contexts, will relate them via the inter-context query fragments, and will assemble them to formulate the resulting query in the Lorel XML query language, as described in ABITEBOUL, S., BUNEMAN, P. and SUCIU, D. (2000): *Data on the Web*, Chapter 4. Morgan Kaufman Publishers, San Francisco, Calif., the entire contents of the disclosure of which is hereby incorporated by reference:

```
SELECT      B.name,
            J.name
FROM        root.student A,
            A.persorn B,
            A.professor C,
            C.faculty D,
            D.person E,
            root.student F,
            F.person G,
            G.professor H,
            G.faculty I,
            I.person J
WHERE       E.name = G.name AND
            A.gpa >= 3.5
```

The resulting query as expressed in OKBC frame-based query language, as described in CHAUDHRI, V., FARQUHAR, A., FIKES, R., KARP, P. and RICE, J. (1998): *Open Knowledge Base Connectivity* 2.02. Stanford Research Institute Publication, Feb. 3, 1998, the entire contents of the disclosure of which is hereby incorporated by reference. http://www.ai.sri.com/~okbc/, the entire contents of which and all sites linked thereto are hereby incorporated by reference, will be:

```
(instance-of ?person Person)
(instance-of ?student Student)
(instance-of ?faculty Faculty)
(instance-of ?person-2 Person)
(instance-of ?student-2 Student)
(instance-of ?faculty-2 Faculty)
(instance-of ?person-3 Person)
(subclass-of ?student ?person)
(subclass-of ?faculty ?person-2)
(subclass-of ?student-2 ?person-2)
(subclass-of ?faculty-2 ?person-3)
(template-slot-value name ?person ?sname)
(template-slot-value gpa ?student ?gpa)
(template-slot-value professor ?student ?faculty)
(template-slot-value professor ?student2 ?faculty-2)
(template-slot-value name ?person-3 ?ppname)
(>= ?gpa 3.5)
```

Both queries are submitted to their respective data source management systems which, in turn, return query results.

Figure 8:
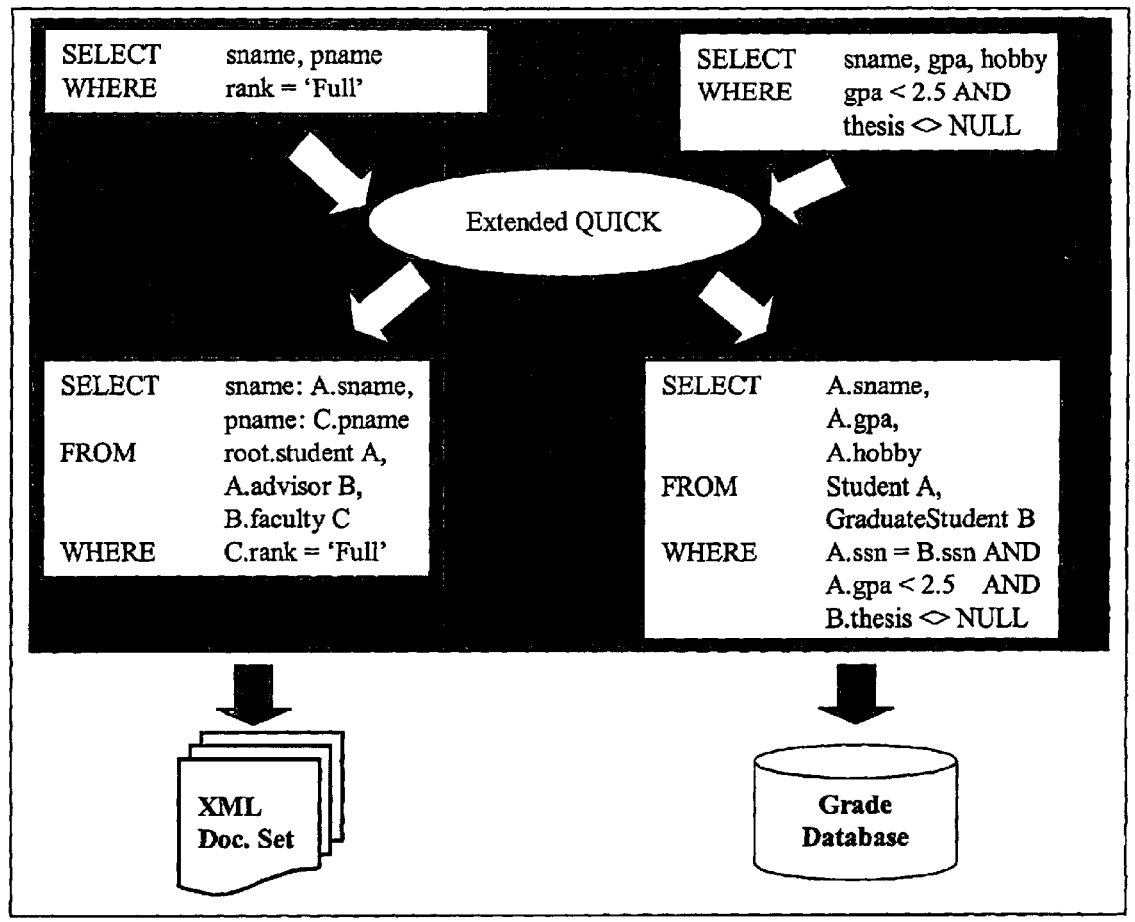
FIG. 8 represents a diagram that illustrates an example of how queries are formulated to individual data sources in their native query languages.

An EQUICK agent resides in the Data Source Access Agents layer of the ADINA architecture (FIG. 1). EQUICK reasons over the ontologies of the registered data sources to infer data source queries from high-level subqueries (FIG. 8). Thus, EQUICK serves as a single software agent that formulates queries to the data sources. It enables the data sources to maintain their autonomy since they do not have to conform to schema or ontology standards. It also frees data source providers from writing and maintaining software wrappers to integrate with the ADINA architecture.

Figure 15:
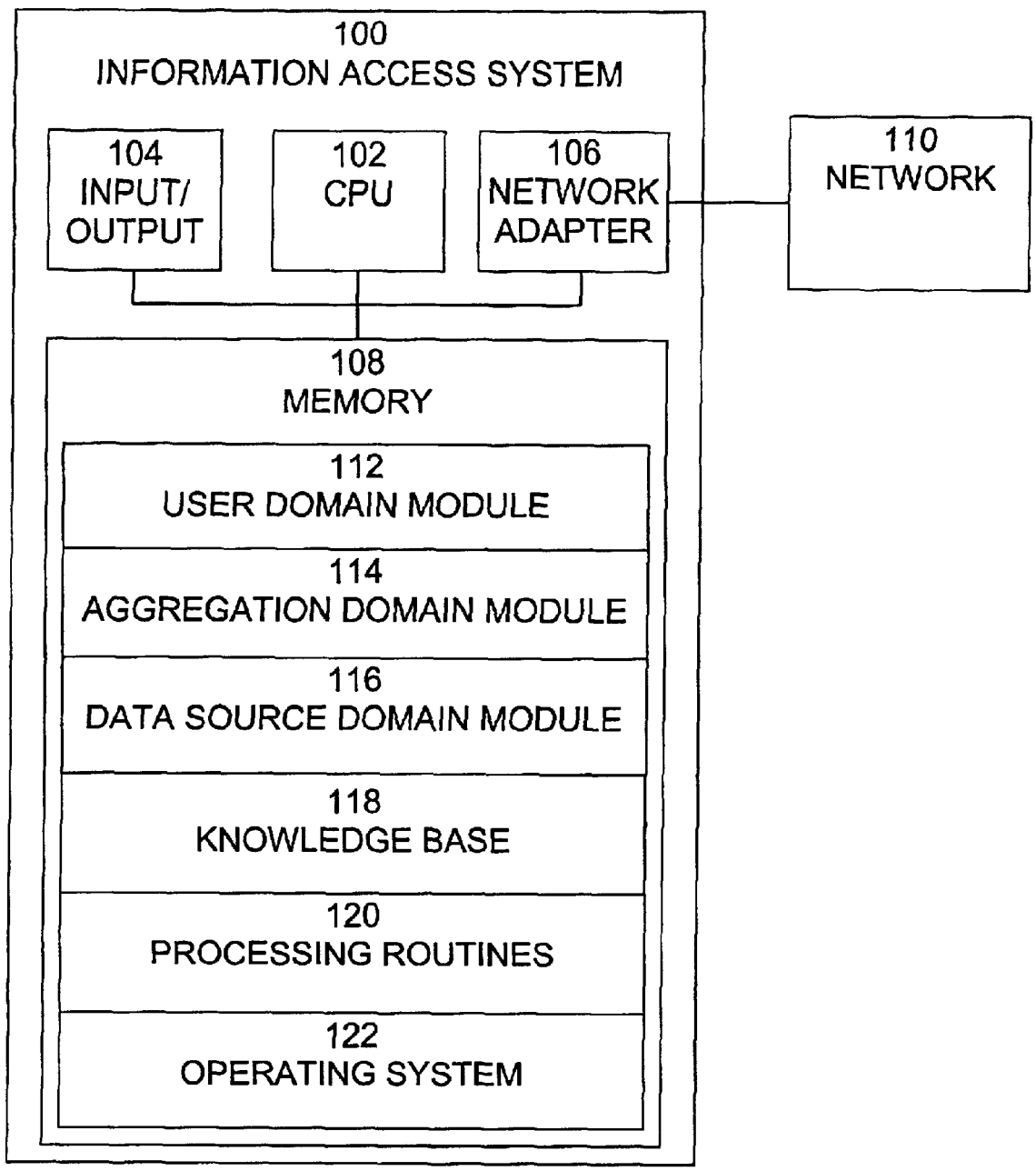
FIG. 15 illustrates an embodiment of an information access system according to the present invention.

The present invention also includes a system and computer program product. FIG. 15 illustrates an exemplary block diagram of an information access system 100, according to the present invention. Information access system 100 is typically a programmed general-purpose computer system, such as a personal computer, workstation, server system, and minicomputer or mainframe computer. Transaction processing system 100 includes processor (CPU) 102, input/output circuitry 104, network adapter 106, and memory 108. CPU 102 executes program instructions in order to carry out the functions of the present invention. Typically, CPU 102 is a microprocessor, such as an INTEL PENTIUM® processor, but may also be a minicomputer or mainframe computer processor. Input/output circuitry 104 provides the capability to input data to, or output data from, computer system 100. For example, input/output circuitry may include input devices, such as keyboards, mice, touchpads, trackballs, scanners, etc., output devices, such as video adapters, monitors, printers, etc., and input/output devices, such as, modems, etc. Network adapter 106 interfaces information access system 100 with network 110. Network 110 may be any standard local area network (LAN) or wide area network (WAN), such as Ethernet, Token Ring, the Internet, or a private or proprietary LAN/WAN.

Memory 108 stores program instructions that are executed by, and data that are used and processed by, CPU 102 to perform the functions of the present invention. Memory 108 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc., or a fiber channel-arbitrated loop (FC-AL) interface.

Memory 108 includes a plurality of blocks of data, such as user domain module block 112, aggregation domain module block 114, data source domain module block 116, knowledge base block 118, and a plurality of blocks of program instructions, such as processing routines 120 and operating system 122. User domain module block 112 stores rules for translating queries received from users and application and translating responses received from the aggregation domain module. Aggregation domain module block 114 stores rules for translating queries received from the user domain module and responses received by the aggregation domain module. Data source domain module block 116 stores a plurality of rules that may be used to determine target data sources that the queries may be transmitted to, translating the queries and responses to the queries. Knowledge base block 118 stores the data model of the generic domain, data models of each data source, conceptual terminology translations between the user domains and the generic domain and conceptual terminology translations between the generic domain and the data sources. Processing routines 120 are software routines that implement the processing performed by the present invention. Operating system 122 provides overall system functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

The present invention provides a layer above the stored data and below the applications provides domain-specific views of the generic data. The data model is a common representation of the conceptual structure and semantics of the underlying stored data. Information sharing, or data passing, from one application to another occurs through views and the underlying implemented data model. This technique allows looser coupling among applications thereby enhancing "plug and play" capability. While the common architecture and common operating environment satisfy basic interoperability, the use of data views coupled with a generic data model extends interoperability to the information domain.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments

We claim:

1. A computer-implemented system for accessing information from a plurality of distributed and heterogeneous data sources each having a plurality of users and applications with a plurality of domain perspectives, the architecture comprising:

a user domain module operable to act as an interface with the users and the applications by translating queries from the users and the applications into a form recognizable by an aggregation domain module and by receiving responses from the aggregation domain module and translating the responses into a form recognizable by the users and applications;

a generic domain data model operable to receive translated queries from the user domain module, translate the queries into a form recognizable to a data source domain module, receive responses from the data source domain module, translate the responses into a form recognizable by the user domain module, and transmit the translated responses to the user domain module; and a data source domain module operable to receive the translated queries from the aggregation domain module, identify target data sources to transmit the queries to, translate the queries specific to the identified data sources, receive responses from the identified data sources, translate the responses, and transmit the translated responses to the aggregation domain module; and a knowledge base comprising a data model of the generic domain, data models of each data source, conceptual terminology translations between the user domains and the generic domain and conceptual terminology translations between the generic domain and the data sources.

2. The computer-implemented system according to claim 1, wherein the data model comprises data classes, data classifications, data subclasses, relationships among data classes, and data attributes.

3. The computer-implemented system according to claim 1, wherein each conceptual terminology translation comprises a mapping between a term in a first domain and constraints of other terms in the first domain to a term in a second domain and constraints of other terms in the second domain.

4. The computer-implemented system according to claim 1, wherein the knowledge base synthesizes user domain conceptual terminology translations, a generic model of the overall domain of discourse, data source domain conceptual terminology translations, and data source models through the user domain module, aggregation module, and the data source module to enable access to a plurality of data sources, and provides knowledge to each of the user domain, aggregation domain, and data source domain.

5. The computer-implemented system according to claim 1, wherein the user domain module utilizes concept mapping from the user to generic domains.

6. The computer-implemented system according to claim 1, wherein the aggregation domain module comprises a generic data model that describes an overall domain and is described by groupings of data and relationships and classifications among the groupings of data.

7. The computer-implemented system according to claim 1, wherein the data source domain module comprises data models of the data sources, and wherein the data models describe groupings of data and relationships and classifications among the groupings of data.

8. The computer-implemented system according to claim 1, further comprising:

a plurality of user domains each described by concept mappings from user domains to the generic model, wherein the user domain module is operable as an interface between the user applications and the sources by translating queries from the users applications into forms recognizable by the aggregation domain module and operable to translate responses from the aggregation domain module into a form recognizable by the users and the applications.

9. The computer-implemented system according to claim 1, wherein the user domain module is operable to receive queries in terminology of the users and applications.

10. The computer-implemented system according to claim 1, wherein the user domain module, the aggregation domain module, and the data source domain module are operable to utilize the conceptual terminology translations to translate the queries.

11. The computer-implemented system according to claim 1, wherein the aggregation domain uses an overall model of all user domain and database domain models.

12. The computer-implemented system according to claim 1, wherein the users and the applications express queries using a high-level request language in the terminology of the user domains and the application domains.

13. The computer-implemented system according to claim 1, wherein the user domain module, the aggregation domain module, and the data source domain module utilize the conceptual terminology translations to dissect the queries.

14. The computer-implemented system according to claim 1, wherein the data source domain module translates the queries by selecting matching data source contexts.

15. A computer-implemented method for accessing information from distributed heterogeneous sources, the method comprising:

receiving queries from users and applications;

translating the queries to a form from which it can be determined the data sources to address the queries;

determining which data sources the queries should be transmitted to;

formulating data source queries that navigate underlying representations of the data sources in native languages of the data sources;

transmitting the queries to the data sources;

receiving responses to the queries;

aggregating the response from individual data sources into a single response;

translating the responses into form recognizable to the users and applications; and transmitting the responses to the users and applications;

wherein the queries from the users and the applications are received and translated by a user domain;

receiving the translated queries with a user domain;

further translating the queries with an aggregation domain into a form from which it can be determined which data source to transmit the queries to; and transmitting the further translated queries to a data source domain;

receiving the further translate queries with the data source domain;

formulating data source queries that navigate underlying representations of the data sources in native languages of the data sources; and transmitting at least portions of the queries to the data sources;

wherein the data source domain module receives responses to the queries from the data sources, translates the responses to the queries and transmits the translated responses to the aggregation domain module, wherein the aggregation domain module receives the translated responses, aggregates the data returned from individual data sources, and transmits the translated responses to the user domain module which further translates the responses into a form recognizable to the users and applications.

16. A computer-implemented method for accessing information from a plurality of diverse data sources, the system comprising:

a user domain module, comprising:

a query parser for receiving queries from users and applications, the queries comprising information to be retrieved, relationships of among the information, and constraints associated with the information;

an attribute name resolver for translating the queries into a form recognizable to a generic domain data model; and a generic to attribute name converter for translating responses to the queries into a form recognizable by the applications and users;

an aggregation domain module, comprising:

an attribute name location mapper for receiving translated queries from the user domain and determining locations of data for responding to the queries;

a location resolver for determining a best location for data when multiple locations exist; and a data aggregation function for receiving responses from data sources and translating data in the responses into a form recognizable by the user domain;

a data source domain module, comprising:

a generic to data source converter for converting query attributes to a form recognizable to locations where the data is stored;

a query generator to automatically formulated data source queries to navigate underlying representations of the data sources in native query languages of the data sources;

a query transmitter for transmitting the formulated queries to the data source locations; and a data converter for receiving responses to the formulated queries from the data storage locations and translating the responses to the terminology of the generic to attribute name converter; and a knowledge base module, comprising:

a data model of the generic domain, data models of each data source, conceptual terminology translations between the user domains and the generic domain and conceptual terminology translations between the generic domain and the data sources.

* * * * *

UNITED STATES PATENT AND TRADEMARK OFFICE
CERTIFICATE OF CORRECTION

PATENT NO. : 6,957,214 B2
DATED : October 18, 2005
INVENTOR(S) : Silberberg et al.

Page 1 of 1

It is certified that error appears in the above-identified patent and that said Letters Patent is hereby corrected as shown below:

Column 18,
Line 57, delete "source" and insert -- sources --.
Line 61, delete "translate" and insert -- translated --.

Column 20,
Line 11, delete "formulated" and insert -- formulate --.

Signed and Sealed this

Twenty-fifth Day of April, 2006

JON W. DUDAS
*Director of the United States Patent and Trademark Office*